(12) United States Patent
Wang et al.

(10) Patent No.: US 11,660,777 B2
(45) Date of Patent: May 30, 2023

(54) GYPSUM PANELS, SYSTEMS, AND METHODS

(71) Applicant: Georgia-Pacific Gypsum LLC, Atlanta, GA (US)

(72) Inventors: Xian-Yong Wang, Duluth, GA (US); Stuart Brandon Gilley, Atlanta, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 626 days.

(21) Appl. No.: 16/536,607

(22) Filed: Aug. 9, 2019

(65) Prior Publication Data

US 2020/0078980 A1  Mar. 12, 2020

Related U.S. Application Data

(60) Provisional application No. 62/728,095, filed on Sep. 7, 2018.

(51) Int. Cl.
| | |
|---|---|
| C04B 22/16 | (2006.01) |
| B28B 1/16 | (2006.01) |
| B32B 13/08 | (2006.01) |
| B28B 11/24 | (2006.01) |
| B32B 13/14 | (2006.01) |
| C04B 24/42 | (2006.01) |

(Continued)

(52) U.S. Cl.
CPC ............. B28B 1/16 (2013.01); B28B 11/243 (2013.01); B32B 13/08 (2013.01); B32B 13/14 (2013.01); C04B 22/16 (2013.01); *B32B 2607/00* (2013.01); *C04B 24/42* (2013.01); *C04B 2111/0062* (2013.01); *C04B 2111/27* (2013.01)

(58) Field of Classification Search
CPC . C04B 22/16; C04B 24/2623; C04B 24/2629; C04B 24/42
See application file for complete search history.

(56) References Cited

U.S. PATENT DOCUMENTS

| | | |
|---|---|---|
| 4,341,560 A | 7/1982 | Saito |
| 4,371,399 A * | 2/1983 | May ........................ C04B 28/14 106/781 |
| 9,739,059 B2 | 8/2017 | Thomas |

(Continued)

FOREIGN PATENT DOCUMENTS

| | | |
|---|---|---|
| AU | 201 6215362 A1 | 8/2017 |
| AU | 2016215345 A1 | 8/2017 |

(Continued)

OTHER PUBLICATIONS

International Search Report and Written Opinion received for PCT patent application No. PCT/US2019/045913, dated Dec. 18, 2019, 22 pages.

*Primary Examiner* — Scott W Dodds

(57) ABSTRACT

Gypsum panels and methods of making the same are provided. A method of making a gypsum panel includes forming a first gypsum slurry by combining stucco, water, a siliconate, and a phosphate salt or polymer, and setting the first gypsum slurry to form at least part of a core of the gypsum panel, wherein the gypsum panel displays a 2-hour water absorption test weight increase of at least 10 weight percent less than an otherwise identical comparative panel containing no phosphate salt or polymer in its core.

17 Claims, 8 Drawing Sheets

(51) Int. Cl.
*C04B 111/00* (2006.01)
*C04B 111/27* (2006.01)

(56) References Cited

U.S. PATENT DOCUMENTS

| | | | |
|---|---|---|---|
| 9,869,089 B2 | 1/2018 | Thomas | |
| 9,879,426 B2 | 1/2018 | Tilford | |
| 10,077,552 B2 | 9/2018 | Thomas | |
| 10,179,997 B2 | 1/2019 | Thomas | |
| 10,407,907 B2 | 9/2019 | Thomas | |
| 2003/0211305 A1 | 11/2003 | Koval | |
| 2009/0208714 A1* | 8/2009 | Currier | C04B 28/14 428/212 |
| 2014/0121303 A1* | 5/2014 | Hagen | C04B 28/02 524/5 |
| 2014/0178624 A1 | 6/2014 | Tilford | |
| 2016/0168026 A1* | 6/2016 | Moore | E04B 1/942 106/711 |
| 2016/0222656 A1 | 8/2016 | Teng | |
| 2019/0010697 A1 | 1/2019 | Thomas | |
| 2019/0376286 A1 | 12/2019 | Thomas | |

FOREIGN PATENT DOCUMENTS

| | | |
|---|---|---|
| BE | 777477 A | 6/1972 |
| CA | 2975742 A1 | 8/2016 |
| CA | 2975744 A1 | 8/2016 |
| CA | 3014729 A1 | 8/2016 |
| CA | 2895797 C | 9/2017 |
| CN | 107532422 B | 12/2019 |
| CN | 107548424 B | 12/2019 |
| DE | DD63320 A1 | 8/1968 |
| EP | 3253930 A1 | 12/2017 |
| EP | 3253931 A1 | 12/2017 |
| EP | 3253930 A4 | 10/2018 |
| EP | 3253931 A4 | 10/2018 |
| MX | 2015008092 A | 3/2016 |
| MX | 2017009996 A | 2/2018 |
| MX | 2017009997 A | 3/2018 |
| RU | 2007131241 A | 2/2009 |
| WO | WO2014099898 A1 | 6/2014 |
| WO | WO2016081390 A1 | 5/2016 |
| WO | WO2016126825 A1 | 8/2016 |
| WO | WO2016126842 A1 | 8/2016 |
| WO | WO2016126850 A1 | 8/2016 |
| WO | WO2017140784 A1 | 8/2017 |

* cited by examiner

GYPSUM PANELS, SYSTEMS, AND METHODS

CROSS-REFERENCE TO RELATED APPLICATIONS

This application claims priority benefit of U.S. Provisional Application No. 62/728,095, filed on Sep. 7, 2018, the disclosure of which is incorporated by reference herein in its entirety.

BACKGROUND

The present invention relates generally to the field of panels for use in building construction, and more particularly to gypsum panels and methods of making gypsum panels.

Typical building panels, such as building sheathing or roof panels, include a core material, such as gypsum, and a mat facer, such as a fiberglass mat facer. During manufacturing, the gypsum core material is traditionally applied as a slurry to a surface of the mat facer and allowed to set, such that the mat facer and gypsum core are adhered at the interface. Often, such panels suffer from water intrusion and other performance issues.

Accordingly, it would be desirable to provide panels having improved water-resistive properties.

SUMMARY

Gypsum panels and methods of making gypsum panels are provided. A method of making a gypsum panel includes: forming a first gypsum slurry by combining stucco, water, a siliconate, and a phosphate salt or polymer; and setting the first gypsum slurry to form at least part of a core of the gypsum panel, wherein the gypsum panel displays a 2-hour water absorption test weight increase of at least 10 weight percent less than an otherwise identical comparative panel containing no phosphate salt or polymer in its core.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Figure 1:
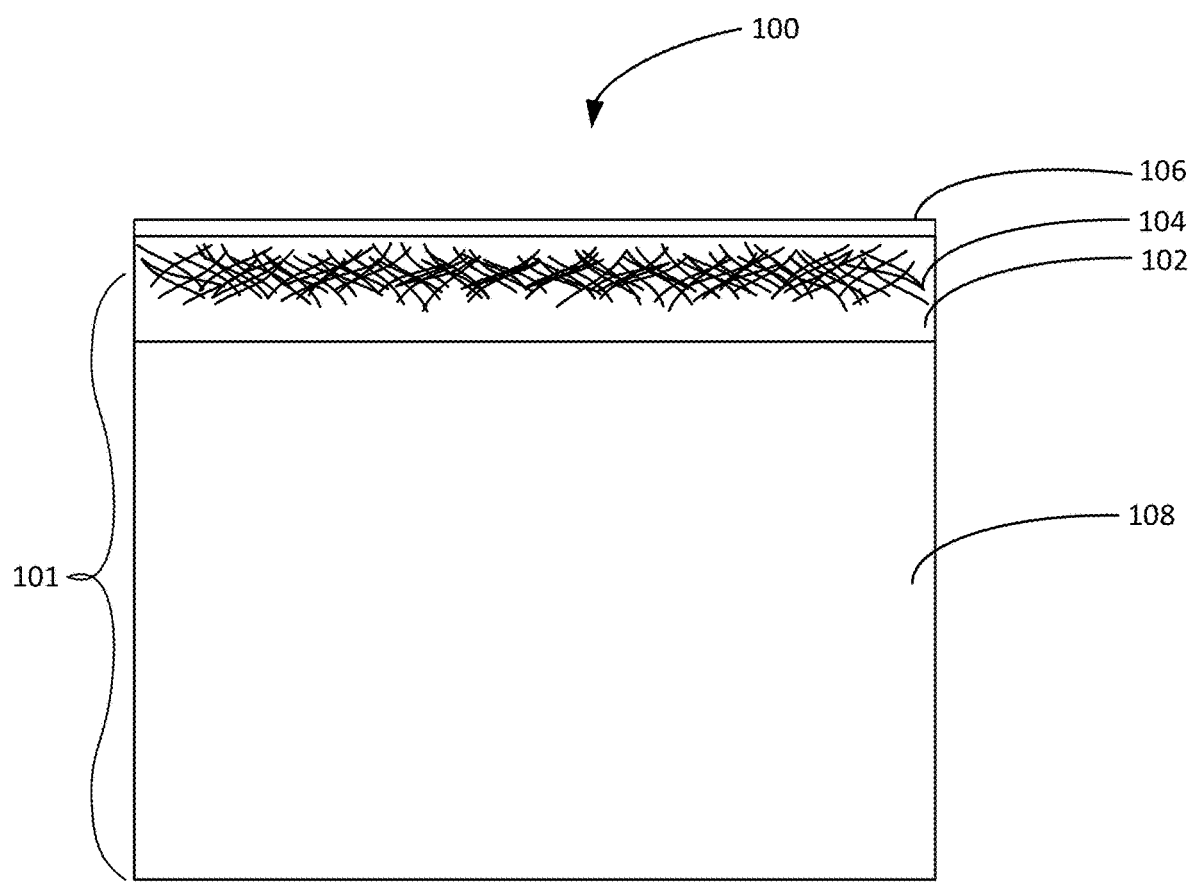
FIG. 1 is a cross-sectional view of a gypsum panel.

Improved water repelling, or water-resistive, gypsum panels have been developed, along with associated methods for their manufacture. In certain embodiments, the panels contain a relatively high amount of a siliconate in at least a portion (e.g., in at least a layer) of the gypsum panel core, optionally without any siloxane. In certain embodiments, the relatively high amount of siliconate is combined with a relatively low amount of siloxane. Further, the siliconate and/or blend of siliconate/siloxane is combined with a phosphate salt or polymer. Such panels have been discovered to display improved water-resistant and moisture migration properties, while maintaining the mechanical properties of gypsum products, such as nail pull and flexural strength, compressive strength and humid bond.

Generally, this disclosure is intended to encompass various forms of gypsum panel products, such as sheathing panels, roofing panels, and other glass mat and paper faced gypsum panels. While certain embodiments may be described with reference to the term "sheathing" or "roofing", it should be understood that the panels described herein are not meant to be limited to these particular uses, and that the features of panels described as sheathing or roofing panels may be encompassed by other types of gypsum panels.

As used herein, the term "water-resistive" or similar phrases refers to the ability of a panel or system to resist liquid or bulk water from penetrating, leaking, or seeping past the sheathing and into the surrounding wall components. Such properties may be further defined according to various ASTM test methods, which are described herein.

Gypsum panels or boards may contain a set gypsum core sandwiched between two mats, one or both of which may be coated. The mat coating may be a substantially continuous barrier coating. As used herein, the term "substantially continuous barrier coating" refers to a coating material that is substantially uninterrupted over the surface of the mat.

During manufacturing, a gypsum slurry may be deposited on the uncoated surface of a facer material, such as a paper sheet or fiberglass mat (which may be pre-coated offline or online), and set to form a gypsum core of the panel. The gypsum slurry may penetrate some portion of the thickness of the fiberglass mat or adhere to a paper facing material, and provide a mechanical bond for the panel. The gypsum slurry may be provided in one or more layers, having the same or different compositions, including one or more slate coat layers. As used herein, the term "slate coat" refers to a gypsum slurry having a higher wet density than the remainder of the gypsum slurry that forms the gypsum core.

While this disclosure is generally directed to gypsum panels, it should be understood that other cementitious panel core materials are also intended to fall within the scope of the present disclosure. For example, cementitious panel core materials such as those including magnesium oxide or aluminosilicate may be substituted for the gypsum of the embodiments disclosed herein, to achieve similar results.

Moreover, while embodiments of the present disclosure are described generally with reference to fiberglass mats or paper facing materials, it should be understood that other mat materials, including other fibrous mat materials, may also be used in the present panels. In certain embodiments, the nonwoven fibrous mat is formed of fiber material that is capable of forming a strong bond with the material of the building panel core through a mechanical-like interlocking between the interstices of the fibrous mat and portions of the core material. Examples of fiber materials for use in the nonwoven mats include mineral-type materials such as glass fibers, synthetic resin fibers, and mixtures or blends thereof. Both chopped strands and continuous strands may be used.

Various embodiments of this disclosure are for purposes of illustration only. Parameters of different steps, components, and features of the embodiments are described separately, but may be combined consistently with this description of claims, to enable other embodiments as well to be understood by those skilled in the art. Various terms used herein are likewise defined in the description, which follows.

Methods

In certain embodiments, methods of making gypsum panels in accordance with this disclosure include forming a first gypsum slurry by combining stucco, water, a siliconate, and a phosphate salt or polymer, and setting the first gypsum slurry to form at least part of a core of the gypsum panel. The siliconate may be present in the slurry in an amount that is higher than is typical, such as from about 3 lb/msf to about 50 lb/msf, for a gypsum panel having a thickness of about ¼ inch to about 1 inch. As used herein the term "about" is used to refer to is used to refer to plus or minus 2 percent of the relevant numeral that it describes. These methods may be used to produce gypsum panels having any of the features, or combinations of features, described herein. In particular, these methods may be used to produce gypsum panels that displays a 2-hour water absorption test weight increase of at least 10 weight percent less than an otherwise identical comparative panel containing no phosphate salt or polymer in its core. For example, these methods may be used to produce gypsum panels having improved water-resistant characteristics, such as gypsum panels that display a water absorption of less than about 15 percent, such as 5 percent, by weight, after a 2-hour immersion.

The panel thickness ranges given herein are meant to be exemplary, and it should be understood that panels in accordance with the present disclosure may have any suitable thickness. Where amounts of materials present within the panel are defined in terms of lb/msf over a certain thickness of panel, it should be understood that the amount of the relevant material described to be present per volume of the panel may be applied to various other panel thicknesses. In certain embodiments, the panels have a thickness from about ¼ inch to about 1 inch. For example, the panels may have a thickness of from about ½ inch to about ⅝ inch, such as from about ½ inch to about ¾, as generally described.

In some embodiments, the first gypsum slurry contains siliconate but is free of siloxane, while achieving the water-resistant properties described herein. In other embodiments, the first gypsum slurry contains stucco, water, a siloxane, and a siliconate. In such embodiments, the ratio of siloxane to siliconate in the first gypsum slurry may be from about 1:1 to about 1:50, which represents a relatively high amount of siliconate as compared to traditional panels. As described herein and demonstrated by the Examples, it was discovered that relatively low siloxane and high siliconate usage, and even siliconate usage with no siloxane, achieved target water resistant and moisture resistance (e.g., as measured by 2 hours total immersion and surface water absorption standards) without impaired board quality and processing.

In certain embodiments, the ratio of siloxane to siliconate in the first gypsum slurry is from about 1:1 to about 1:30, such as from about 1:1 to about 1:20, such as from about 1:1 to about 1:15, such as from about 1:1 to about 1:10, such as from about 1:1 to about 1:5. For example, the siliconate may be present in the first gypsum slurry in an amount of from about 3 lb/msf to about 50 lb/msf, for a gypsum panel having a thickness of about ¼ inch to about 1 inch. For example, the siliconate may be present in the first gypsum slurry in an amount of from about 10 lb/msf to about 40 lb/msf, for a gypsum panel having a thickness of about ¼ inch to about 1 inch, such as in an in an amount of from about 10 lb/msf to about 30 lb/msf, such as in an amount of from about 15 lb/msf to about 30 lb/msf. For example, the siloxane may be present in the first gypsum slurry in an amount of from about 1 lb/msf to about 20 lb/msf, for a gypsum panel having a thickness of about ¼ inch to about 1 inch, such as in an amount of from about 2 lb/msf to about 10 lb/msf, for a gypsum panel having a thickness of about ¼ inch to about 1 inch.

The siloxane and siliconate materials may be any suitable siliconate or siloxane chemistries. For example, the siliconate may be an alkaline metal alkylsiliconate or an aromaticsiliconate, including but not limited to, sodium or potassium methylsiliconate, sodium or potassium ethyl siliconate, propylsiliconate, isopropylsiliconate, butylsiliconate, octylsiliconate, phenylsiliconate, or any combination thereof. For example, the siloxane may be polymethylhydrogensiloxane.

For example, the phosphate salt or polymer may be sodium trimetaphosphate (STMP), sodium hexametaphosphate (SHMP), ammonium polyphosphate (APP), polyvinyl alcohol (PVA), a hydrophobic latex, or a dispersible polymer powder comprising a styrene/maleic acid copolymer, a styrene-butadiene copolymer, a styrene-acrylate, an acrylate, or a terpolymer of ethylene, vinyl chloride and vinyl laurate. Other suitable phosphate salts or polymers such as other hydrophobic latex materials may also be used. For example, other suitable phosphate salts may include other metaphosphate, polyphosphate, and pyrophosphate salts, such as ammonium trimetaphosphate, potassium trimetaphosphate, lithium trimetaphosphate, calcium trimetaphosphate, sodium calcium trimetaphosphate, aluminum trimetaphosphate; ammonium, lithium, or potassium hexametaphosphates; sodium tripolyphosphate, potassium tripolyphosphate, sodium and potassium tripolyphosphate; calcium pyrophosphate, tetrapotassium pyrophosphate, and/or tetrasodium pyrophosphate.

In certain embodiments, the phosphate salt or polymer is present in the first gypsum slurry in an amount of 0.5 lb/msf to about 50 lb/msf, for a gypsum panel having a thickness of about ¼ inch to about 1 inch. For example, the phosphate salt or polymer may be present in the first gypsum slurry in an amount of from about 10 lb/msf to about 30 lb/msf, for a gypsum panel having a thickness of about ¼ inch to about 1 inch.

In some embodiments, the phosphate salt or polymer contains PVA and is present in the first gypsum slurry in an amount of from about 10 lb/msf to about 30 lb/msf, for a gypsum panel having a thickness of about ¼ inch to about 1 inch. In some embodiments, the phosphate salt or polymer is a phosphate salt, such as sodium trimetaphosphate (STMP), sodium hexametaphosphate (SHMP), and/or ammonium polyphosphate (APP), and is present in the first gypsum slurry in an amount of from about 0.5 lb/msf to about 10 lb/msf, for a gypsum panel having a thickness of about ¼ inch to about 1 inch. In some embodiments, the phosphate salt or polymer contains a hydrophobic latex or dispersible polymer powder, such as a styrene/maleic acid copolymer, a styrene-butadiene copolymer, a styrene-acrylate, an acrylate, or a terpolymer of ethylene, vinyl chloride and vinyl laurate, and is present in the first gypsum slurry in an amount of from about 3 lb/msf to about 10 lb/msf, for a gypsum panel having a thickness of about ¼ inch to about 1 inch.

Figure 2:
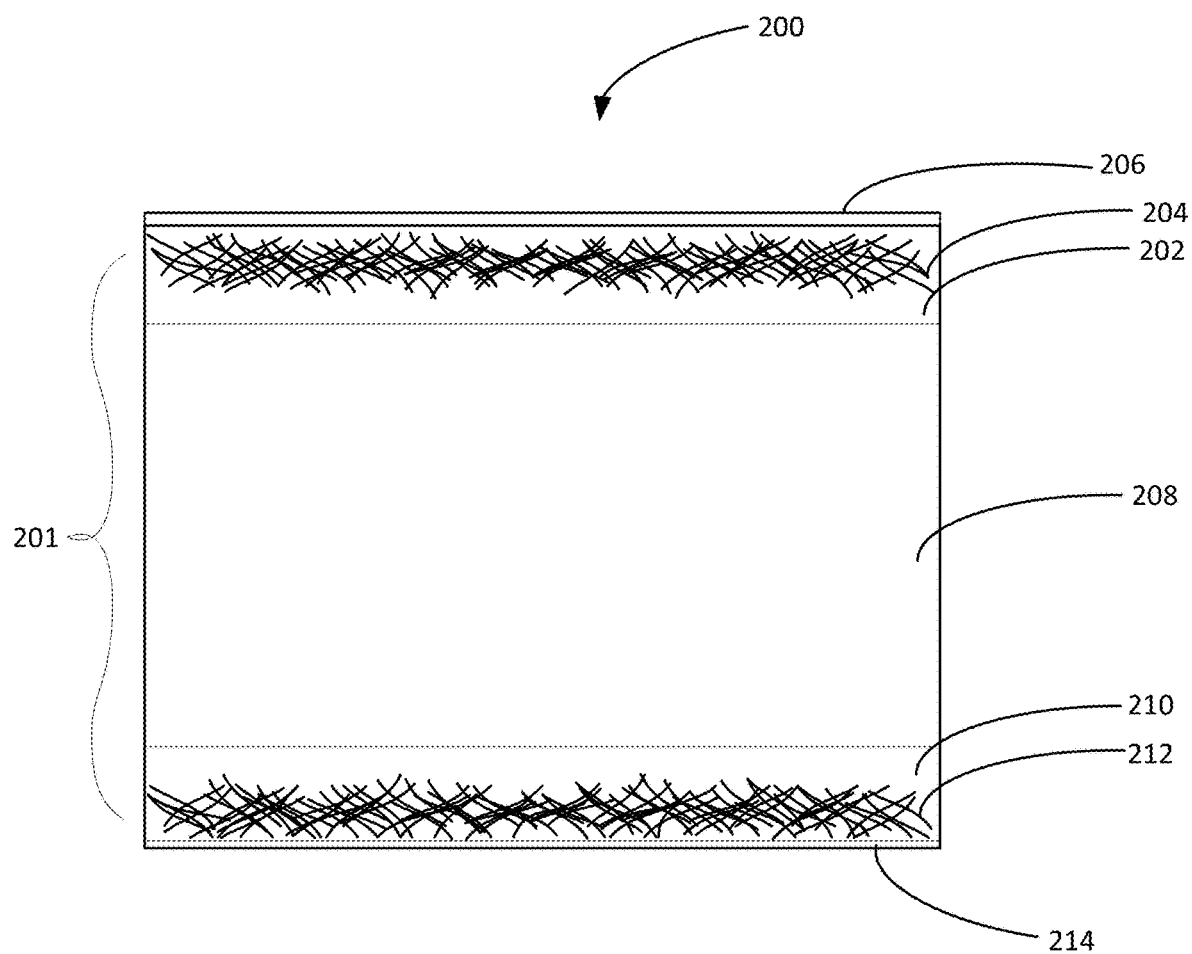
FIG. 2 is a cross-sectional view of a gypsum panel

In certain embodiments, the gypsum core includes multiple layers that are sequentially applied to a facing material, and allowed to set either sequentially or simultaneously, as shown in FIG. 1. In such embodiments, the first gypsum slurry may form any one or more of these layers. In other embodiments, the gypsum core includes a single layer formed by the first gypsum slurry. In some embodiments, a second facing material may be deposited onto a surface of the final gypsum slurry layer (or the sole gypsum slurry layer), to form a dual mat-faced gypsum panel, as shown in FIG. 2. In certain embodiments, the first gypsum slurry (or each of the outermost gypsum slurry layers) is deposited in an amount of from about 5 percent to about 20 percent, by weight, of the gypsum core. The gypsum slurry or multiple layers thereof may be deposited on the facer material by any suitable means, such as roll coating.

In certain embodiments, the first gypsum slurry (or other gypsum slurry layers that form the core) contains one or more additional agents to enhance its performance, such as, but not limited to, wetting agents, fillers, accelerators, set retarders, foaming agents, and dispersing agents. Various example uses of such additives will now be described.

In certain embodiments, a wetting agent is selected from a group consisting of surfactants, superplasticisers, dispersants, agents containing surfactants, agents containing superplasticisers, agents containing dispersants, and combinations thereof. For example, the gypsum slurry or layer(s) may include wax, wax emulsions and co-emulsions, silicone, siloxane, or a combination thereof. For example, suitable superplasticisers include Melflux 2651 F and 4930F, commercially available from BASF Corporation. In certain embodiments, the wetting agent is a surfactant having a boiling point of 200° C. or lower. In some embodiments, the surfactant has a boiling point of 150° C. or lower. In some embodiments, the surfactant has a boiling point of 110° C. or lower. For example, the surfactant may be a multifunctional agent based on acetylenic chemistry or an ethoxylated low-foam agent.

In certain embodiments, a surfactant is present in the relevant gypsum slurry in an amount of about 0.01 percent to about 1 percent, by weight. In certain embodiments, the surfactant is present in the relevant gypsum slurry in an amount of about 0.01 percent to about 0.5 percent, by weight. In some embodiments, the surfactant is present in the relevant gypsum slurry in an amount of about 0.05 percent to about 0.2 percent, by weight.

Suitable surfactants and other wetting agents may be selected from non-ionic, anionic, cationic, or zwitterionic compounds, such as alkyl sulfates, ammonium lauryl sulfate, sodium lauryl sulfate, alkyl-ether sulfates, sodium laureth sulfate, sodium myreth sulfate, docusates, dioctyl sodium sulfosuccinate, perfluorooctanesulfonate, perfluorobutanesulfonate, linear alkylbenzene sulfonates, alkyl-aryl ether phosphates, alkyl ether phosphate, alkyl carboxylates, sodium stearate, sodium lauroyl sarcosinate, carboxylate-based fluorosurfactants, perfluorononanoate, perfluorooctanoate, amines, octenidine dihydrochloride, alkyltrimethylammonium salts, cetyl trimethylammonium bromide, cetyl trimethylammonium chloride, cetylpyridinium chloride, benzalkonium chloride, benzethonium chloride, 5-Bromo-5-nitro-1,3-dioxane, dimethyldioctadecylammonium chloride, cetrimonium bromide, dioctadecyldimethylammonium bromide, sultaines, cocamidopropyl hydroxysultaine, betaines, cocamidopropyl betaine, phospholipids phosphatidylserine, phosphatidylethanolamine, phosphatidylcholine, sphingomyelins, fatty alcohols, cetyl alcohol, stearyl alcohol, cetostearyl alcohol, stearyl alcohols. oleyl alcohol, polyoxyethylene glycol alkyl ethers, octaethylene glycol monododecyl ether, pentaethylene glycol monododecyl ether, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, polyethoxylated tallow amine, and block copolymers of polyethylene glycol and polypropylene glycol. For example, suitable surfactants include Surfynol 61, commercially available from Air Products and Chemicals, Inc. (Allentown, Pa.).

In certain embodiments, the gypsum slurry (or one or more layers thereof) is substantially free of foam, honeycomb, excess water, and micelle formations. As used herein, the term "substantially free" refers to the slurry containing lower than an amount of these materials that would materially affect the performance of the panel. That is, these materials are not present in the slurry in an amount that would result in the formation of pathways for liquid water in the glass mat of a set panel, when under pressure.

In certain embodiments, the panel core slurry (or layers thereof) may be deposited on a horizontally oriented moving web of facer material, such as pre-coated fibrous mat or paper facing material. A second coated or uncoated mat may be deposited onto the surface of the panel core slurry opposite the mat, e.g., a non-coated surface of the second mat contacts the panel core slurry. In some embodiments, a moving web of a mat may be placed on the upper free surface of the aqueous panel core slurry. Thus, the panel core material may be sandwiched between two facer mats, one or both having a mat coating. In certain embodiments, allowing the panel core material and/or mat coating to set includes curing, drying, such as in an oven or by another suitable drying mechanism, or allowing the material(s) to set at room temperature (i.e., to self-harden).

A barrier coating may be applied to one or both (in embodiments having two) mat surfaces, prior to or after drying of the mat. In some embodiments, the mats are pre-coated when they are associated with the panel core slurry. In some embodiments, depositing a barrier coating onto the second surface of the first coated mat occurs after setting the first gypsum slurry to form at least a portion of a gypsum core. In some embodiments, the gypsum core coated with the barrier coating is cured, dried, such as in an oven or by another suitable drying mechanism, or the materials are allowed to set at room temperature. In some embodiment, infrared heating is used to flash off water and dry the barrier coating.

Figure 3:
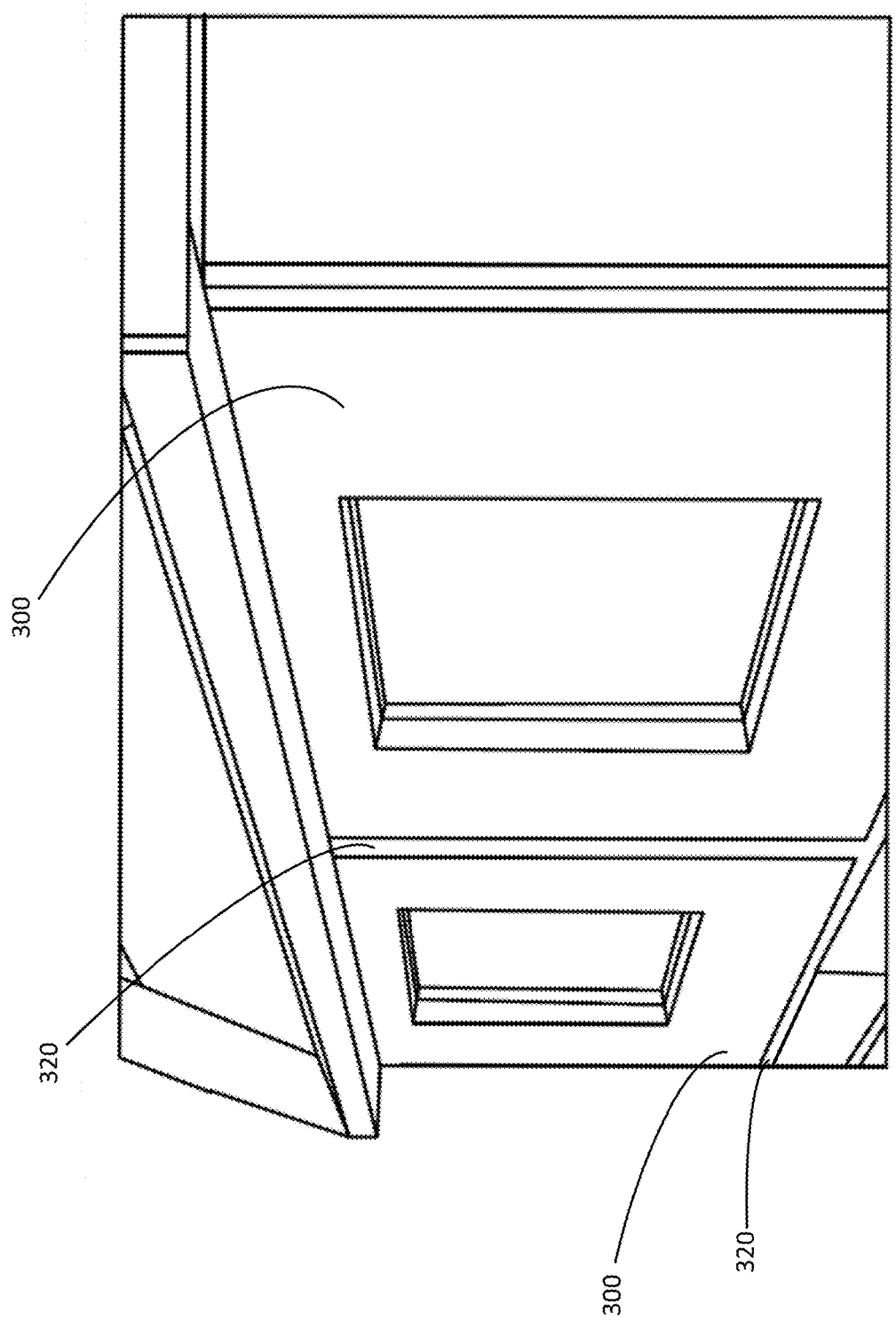
FIG. 3 is a perspective view of a building sheathing system.

Methods of constructing a building sheathing system, as shown in FIG. 3, are also provided herein, including installing at least two gypsum panels 300 having an interface therebetween, and applying a seaming component 320 at the interface between the at least two of the gypsum panels 300. Gypsum panels used in these methods may have any of the features, properties, or combinations of features and/or properties, described herein. Sheathing systems constructed by these methods may have any of the features, properties, or combinations or features and/or properties, described herein. The seaming component may be any suitable seaming component as described herein.

Panels and Systems

Gypsum panels having improved water absorption resistance may be made by any of the methods described herein. Such panels may beneficially display one or more of the following water absorption resistance characteristics: an average water absorption of not more than 15 percent by weight, after 2 hours of immersion, according to ASTM C1396/C1396M-14a (2014), an average water absorption of not more than 5 percent by weight, after 2 hours of immersion, according to ASTM C1396/C1396M-14a (2014), an average water absorption of not more than 15 percent by weight, after 2 hours of immersion, according to ASTM C1177/C117M-13 (2013), and/or an average water absorption of not more than 5 percent by weight, after 2 hours of immersion, according to ASTM C1178/C1188M-13 (2013).

In certain embodiments, as shown in FIG. 1, a gypsum panel 100 includes a gypsum core 101 having a first surface and a second opposed surface, and a first facer material 104 (shown here as a fibrous mat, though paper facing materials may also be used, as discussed herein) associated with the first surface of the gypsum core 101, such that gypsum of the gypsum core penetrates at least a portion of the first mat 104. The various layers are illustrated as separate layers in the figures for ease of illustration; however, it should be understood that overlap of these materials may occur at their interfaces.

In certain embodiments, the gypsum panel 100 includes a set gypsum core 101 associated with a first surface of first fibrous mat 104 and an optional mat coating 106 applied to a second surface of the first fibrous mat 104. For example, the mat coating may have a dry weight of from about 1 pound to about 25 pounds per thousand square feet (lb/msf) of board surface, such as less than 15 pounds per thousand square feet. For example, the mat coating may be substantially continuous, such that it covers at least 99 percent of the board surface, or at least 99.9 percent of the mat surface.

Suitable coating materials (i.e., the precursor to the dried mat coating) contain at least one suitable polymer binder. Suitable polymer binders may be selected from polymeric emulsions and resins, e.g. acrylics, siloxane, silicone, styrene-butadiene copolymers, polyethylene-vinyl acetate, polyvinyl alcohol, polyvinyl chloride (PVC), polyurethane, urea-formaldehyde resin, phenolics resin, polyvinyl butyryl, styrene-acrylic copolymers, styrene-vinyl-acrylic copolymers, styrene-maleic anhydride copolymers. In some embodiments, the polymer binder is an acrylic latex or a polystyrene latex. In some embodiments, the polymer binder is hydrophobic. In certain embodiments, the binder includes UV curable monomers and/or polymers (e.g. epoxy acrylate, urethane acrylate, polyester acrylate). In certain embodiments, the mat coating contains the polymer binder in an amount of from about 5 percent to about 75 percent, by weight, on a dry basis.

Examples of suitable polymer binders that may be used in the continuous barrier coatings described herein include SNAP 720, commercially available from Arkema Coating Resins, which is a structured nano-particle acrylic polymer containing 100% acrylic latex and 49% solids by weight, with a 0.08 micron particle size; SNAP 728, commercially available from Arkema Coating Resins, which is a structured nano-acrylic polymer containing 100% acrylic latex and 49% solids by weight, with a 0.1 micron particle size; and NEOCAR 820, commercially available from Arkema Coating Reins, which is a hydrophobic modified acrylic latex containing 45% solids by weight, with a 0.07 micron particle size.

In certain embodiments, the mat coating also contains one or more inorganic fillers. For example, the inorganic filler may be calcium carbonate or another suitable filler known in the industry. In certain embodiments, the filler is an inorganic mineral filler, such as ground limestone (calcium carbonate), clay, mica, gypsum (calcium sulfate dihydrate), aluminum trihydrate (ATH), antimony oxide, sodium-potassium alumina silicates, pyrophyllite, microcrystalline silica, and talc (magnesium silicate). In certain embodiments, the filler may inherently contain a naturally occurring inorganic adhesive binder. For example, the filler may be limestone containing quicklime (CaO), clay containing calcium silicate, sand containing calcium silicate, aluminum trihydrate containing aluminum hydroxide, cementitious fly ash, or magnesium oxide containing either the sulfate or chloride of magnesium, or both. In certain embodiments, the filler may include an inorganic adhesive binder as a constituent, cure by hydration, and act as a flame suppressant. For example, the filler may be aluminum trihydrate (ATH), calcium sulfate (gypsum), and the oxychloride and oxysulfate of magnesium. For example, fillers may include MINEX 7, commercially available from the Cary Company (Addison, Ill.); IMSIL A-10, commercially available from the Cary Company; and TALCRON MP 44-26, commercially available from Specialty Minerals Inc. (Dillon, Mont.). The filler may be in a particulate form. For example, the filler may have a particle size such that at least 95% of the particles pass through a 100 mesh wire screen.

In certain embodiments, the precursor material that forms the mat coating also contains water. For example, the coating material may contain the polymer binder in an amount of from about 35 percent to about 80 percent, by weight, and water in an amount of from about 20 percent to about 30 percent, by weight. In embodiments containing the filler, the continuous barrier coating material may also contain an inorganic filler in an amount of from about 35 percent to about 80 percent, by weight. In some embodiments, the polymer binder and the inorganic filler are present in amounts of within 5 percent, by weight, of each other. For example, the polymer binder and filler may be present in a ratio of approximately 1:1.

In some embodiments, the mat coating also includes water and/or other optional ingredients such as colorants (e.g., dyes or pigments), transfer agents, thickeners or rheological control agents, surfactants, ammonia compositions, defoamers, dispersants, biocides, UV absorbers, and preservatives. Thickeners may include hydroxyethyl cellulose; hydrophobically modified ethylene oxide urethane; processed attapulgite, a hydrated magnesium aluminosilicate; and other thickeners known to those of ordinary skill in the art. For example, thickeners may include CELLOSIZE QP-09-L and ACRYSOL RM-2020NPR, commercially available from Dow Chemical Company (Philadelphia, Pa.); and ATTAGEL 50, commercially available from BASF Corporation (Florham Park, N.J.). Surfactants may include sodium polyacrylate dispersants, ethoxylated nonionic compounds, and other surfactants known to those of ordinary skill in the art. For example, surfactants may include HYDROPALAT 44, commercially available from BASF Corporation; and DYNOL 607, commercially available from Air Products (Allentown, Pa.). Defoamers may include multi-hydrophobe blend defoamers and other defoamers known to those of ordinary skill in the art. For example, defoamers may include FOAMASTER SA-3, commercially available from BASF Corporation. Ammonia compositions may include ammonium hydroxide, for example, AQUA AMMONIA 26 BE, commercially available from Tanner Industries, Inc. (Southampton, Pa.). Biocides may include broad-spectrum microbicides that prohibit bacteria and fungi growth, antimicrobials such as those based on the active diiodomethyl-ptolylsulfone, and other compounds known to those of ordinary skill in the art. For example, biocides may include KATHON LX 1.5%, commercially available from Dow Chemical Company, POLYPHASE 663, commercially available from Troy Corporation (Newark, N.J.), and AMICAL Flowable, commercially available from Dow Chemical Company. Biocides may also act as preservatives. UV absorbers may include encapsulated hydroxyphenyl-triazine compositions and other compounds known to those of ordinary skill in the art, for example, TINUVIN 477DW, commercially available from BASF Corporation. Transfer agents such as polyvinyl alcohol (PVA) and other compounds known to those of ordinary skill in the art may also be included in the coating composition.

In some embodiments, as shown in FIG. 1, the gypsum of the gypsum core 101 penetrates a remaining portion of the first fibrous mat 104 such that voids in the mat 104 are substantially eliminated and the water resistance of the panel 100 is further enhanced. For example, in one embodiment, the first mat 104 has a mat coating 106 on a surface opposite the gypsum core 101, the mat coating 106 penetrating a portion of the first mat 104, to define the remaining portion of the first mat 104. That is, gypsum of the gypsum core 101 may penetrate a remaining fibrous portion of the first fibrous mat 104 such that voids in the first mat 104 are substantially eliminated.

As used herein the phrase "such that voids in the mat are substantially eliminated" and similar phrases, refer to the gypsum slurry, and thus the set gypsum, of the gypsum core filling all or nearly all of the interstitial volume of the fibrous mat that is not filled by the coating material. In certain embodiments, the gypsum of the gypsum core fills at least 95 percent of the available interstitial volume of the mat. In some embodiments, the gypsum core fills at least 98 percent of the available interstitial volume of the mat. In further embodiments, the gypsum core fills at least 99 percent of the available interstitial volume of the mat.

By maximizing gypsum slurry penetration into the side of the mat receiving gypsum, the movement of water under the mat coating within the glass mat of the finished panel when exposed to bulk water head pressures may be substantially and adequately reduced, without significantly altering the water vapor transmission rate (i.e., the ability to dry) of the finished panel. Thus, the gypsum panels disclosed herein may further display one or more improved water-resistive barrier properties.

In certain embodiments, the mat 104 is a nonwoven fiberglass mat. For example, the glass fibers may have an average diameter of from about 10 to about 17 microns and an average length of from about ¼ inch to about 1 inch. For example, the glass fibers may have an average diameter of 13 microns (i.e., K fibers) and an average length of ¾ inch. In certain embodiments, the nonwoven fiberglass mats have a basis weight of from about 1.5 pounds to about 3.5 pounds per 100 square feet of the mat. The mats may each have a thickness of from about 20 mils to about 35 mils. The fibers may be bonded together to form a unitary mat structure by a suitable adhesive. For example, the adhesive may be a urea-formaldehyde resin adhesive, optionally modified with a thermoplastic extender or cross-linker, such as an acrylic cross-linker, or an acrylate adhesive resin.

In certain embodiments, as shown in FIG. 1, the gypsum core 101 includes two or more gypsum layers 102, 108. For example, the gypsum core may include various gypsum layers having different compositions. In some embodiments, the first gypsum layer 102 that is in contact with the mat 104 (i.e., the layer that forms an interface with the coating material 106 and at least partially penetrates the first mat) is a slate coat layer. In some embodiments, the first gypsum layer 102 is present in an amount from about 5 percent to about 20 percent, by weight, of the gypsum core 101. In certain embodiments, the slate coat layer is formed from the first gypsum slurry described herein (i.e., the slurry having the high siliconate content, with or without siloxane). In other embodiments, the entire panel core is formed from the first gypsum slurry. The first gypsum slurry (i.e., the slurry containing a relatively high amount of siliconate, with or without a relatively low amount of siloxane) may form one or more of these layers.

In certain embodiments, as shown in FIG. 2, a gypsum panel 200 includes two fibrous mats 204, 212 (which could alternatively be paper facers) that are associated with the gypsum core 201. The second mat 212 is present on a face of the gypsum core 201 opposite the first mat 204. In some embodiments, only the first mat 204 has a mat coating 206 on a surface thereof. In other embodiments, both mats 204, 212 have a coating 206, 214 on a surface thereof opposite the gypsum core 201. In some embodiments, the gypsum core 201 includes three gypsum layers 202, 208, 210. One or both of the gypsum layers 202, 210 that are in contact with the mats 204, 212 may be a slate coat layer. In certain embodiments, one or both of the gypsum layers 202, 210 that are in contact with the mats 204, 212 may be a slate coat layer with hydrophobic characteristics and/or a wet density of from about 88 pcf to about 98 pcf, or of from about 93 pcf to about 96 pcf.

The layers of the gypsum core may generally be similar to gypsum cores used in other gypsum products, such as gypsum wallboard, dry wall, gypsum board, gypsum lath, and gypsum sheathing. For example, the gypsum core may be formed by mixing water with powdered anhydrous calcium sulfate or calcium sulfate hemihydrate, also known as calcined gypsum or stucco, to form the aqueous gypsum slurry, and thereafter allowing the slurry mixture to hydrate or set into calcium sulfate dihydrate, a relatively hard material. In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum. The gypsum core may also include a variety of additives, such as accelerators, set retarders, foaming agents, and dispersing agents, in addition to the siliconate/siloxane, as discussed herein.

In certain embodiments, one or more layers of the gypsum core also includes reinforcing fibers, such as chopped glass fibers. For example, the gypsum core, or any layer(s) thereof, may include up to about 0.6 pounds of reinforcing fibers per 100 square feet of panel. For example, the gypsum core, or a layer thereof, may include about 0.3 pounds of reinforcing fibers per 100 square feet of panel. The reinforcing fibers may have a diameter between about 10 and about 17 microns and have a length between about 6.35 and about 12.7 millimeters.

The gypsum core, or one or more layers thereof, may also include one or more additives that enhance the inherent fire resistance of the gypsum core. Such additives may include chopped glass fibers, other inorganic fibers, vermiculite, clay, Portland cement, and other silicates, among others.

In certain embodiments, as discussed above, the building panels described herein may display one or more improved performance characteristics such as water repellence, moisture migration, and other weather-related properties.

Building sheathing systems are also provided herein, and include at least two of the improved water-resistive gypsum panels described herein, including any features, or combinations of features, of the panels described herein.

In certain embodiments, as shown in FIG. 3, a building sheathing system includes at least two gypsum panels 300 and a seaming component 320 configured to provide a seam at an interface between at least two of the gypsum panels 300. In certain embodiments, the seaming component comprises tape or a bonding material. For example, the seaming component may be a tape including solvent acrylic adhesives, a tape having a polyethylene top layer with butyl rubber adhesive, a tape having an aluminum foil top layer with butyl rubber adhesive, a tape having an EPDM top layer with butyl rubber adhesive, a tape having a polyethylene top layer with rubberized asphalt adhesive, or a tape having an aluminum foil top layer with rubberized asphalt adhesive or rubberized asphalt adhesives modified with styrene butadiene styrene. For example, the seaming component may be a bonding material containing silyl terminated polyether, silyl modified polymers, silicones, synthetic stucco plasters and/or cement plasters, synthetic acrylics, sand filled acrylics, and/or joint sealing chemistries comprising solvent based acrylics, solvent based butyls, latex (water-based, including EVA, acrylic), polysulfides polyurethanes, and latexes (water-based, including EVA, acrylic).

Thus, the above-described enhanced panels may be installed with either a tape, liquid polymer, or other suitable material, to effectively treat areas of potential water and air intrusion, such as seams, door/window openings, penetrations, roof/wall interfaces, and wall/foundation interfaces. As such, the building sheathing panels, when used in combination with a suitable seaming component, create an effective water-resistive barrier envelope.

EXAMPLES

Embodiments of the water-resistive panels disclosed herein were constructed and tested, as described below.

First, sample gypsum panels were made using various amounts and ratios of siloxane, siliconate, and phosphate salts and polymers in the gypsum core slurry. Specifically, the gypsum core slurry was made by combining stucco, water, in consistent amounts, with varying amounts of siliconate, with or without siloxane (at various siloxane: siliconate ratios), and various phosphate salts or polymers), according to the sample parameters shown below in Tables 1-4. A 2-hour water absorption test was performed in which the sample panels were immersed for 2 hours and then the percent weight gain was measured. Comparative samples containing no siloxane, siliconate, and/or phosphate salts or polymers were also tested. The results are shown in Tables 1-4 and the water absorption test results are shown in FIGS. 4-7.

Figure 4:
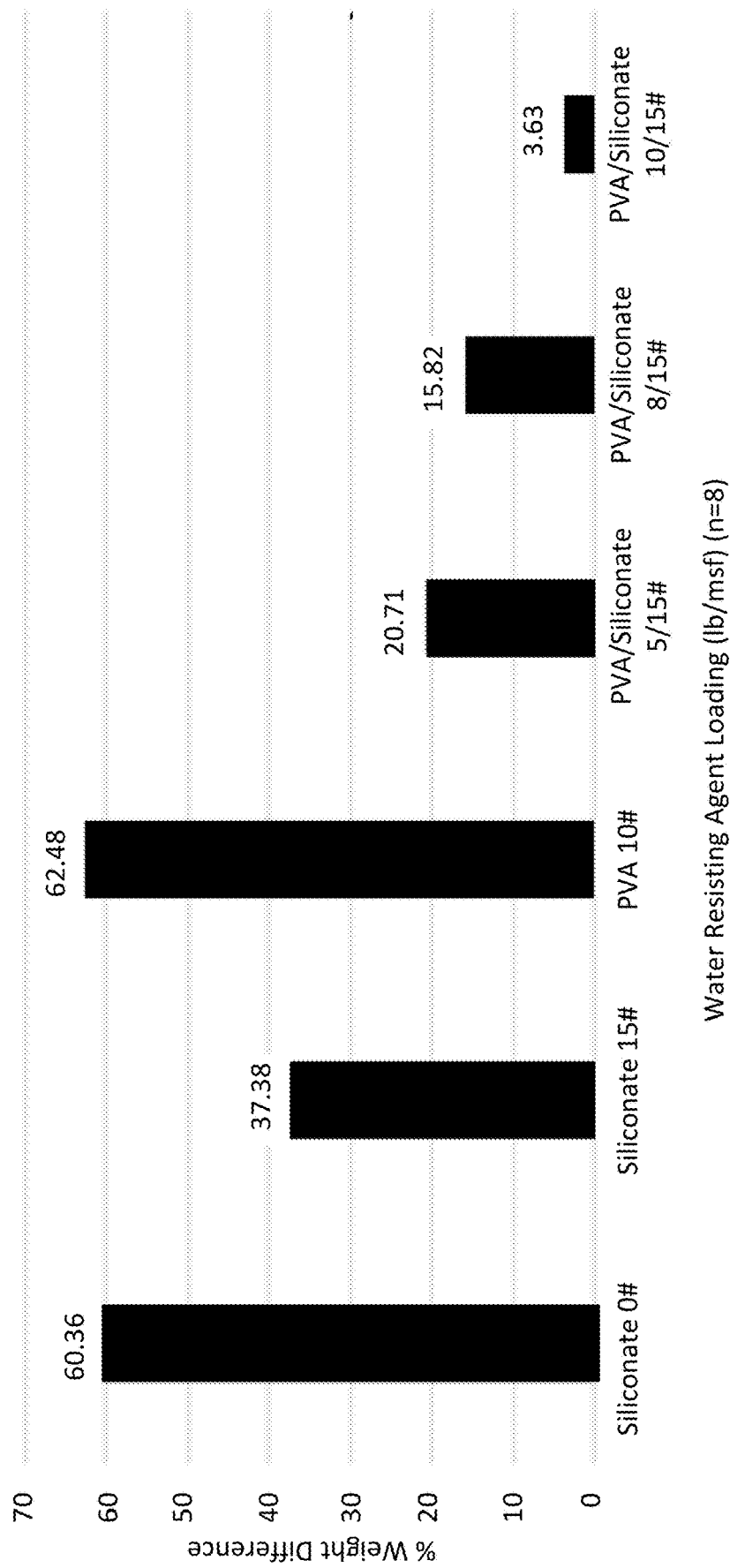
FIG. 4 is a graph showing the total water absorption weight difference (%) for various samples as tested in the Examples.

Table 1 relates to experimental gypsum panels made with 1600 lbs/msf gypsum stucco, siliconate, and polyvinyl alcohol (PVA), in varying amounts. The results of the water absorption tests are also given, and are illustrated in FIG. 4. As can be seen, a panel containing PVA and siliconate in amounts of 10 lbs/msf and 15 lbs/msf, respectively, had a water absorption of 3.63%. By comparison, sample panels having the same amount of siliconate, without PVA, had a water absorption of 37.38%, while sample panels having the same amount of PVA, without siliconate, had a water absorption of 62.48%. Such a significant synergistic effect between these amounts of PVA and siliconate was not predictable. In fact, each sample containing PVA and siliconate displayed at least about a 15% lower weight percent gain then identical panels without the PVA.

Thus, it was surprisingly determined that gypsum boards that contain about 10 lbs/msf PVA and about 15 lbs/msf siliconate are ten times more water resistant than boards with solely 15 lbs/msf siliconate (3.63% compared to 37.38%). PVA/Siliconate blended ratios ranging from about 1.0/1.0 to about 1.0/10.0, by weight, were found to provide water-resistant performance in gypsum boards. The addition rate for PVA and siliconate in such compositions may range from about 3.0 to about 50.0 lbs/msf and about 5.0 to about 50.0 lbs/msf, respectively, such as addition rates for each component being about 10.0 to about 30.0 lbs/msf.

TABLE 1

| Sample Board Parameters and Test Results | | | | | | |
|---|---|---|---|---|---|---|
| Components | Control | Siliconate | PVA | PVA | PVA | PVA |
| PVA (lbs/msf) | 0 | 0 | 10 | 5 | 8 | 10 |
| Siliconate (lbs/msf) | 0 | 15 | 0 | 15 | 15 | 15 |
| Stucco (lbs/msf) | 1600 | 1600 | 1600 | 1600 | 1600 | 1600 |
| Water:Stucco Ratio | 0.78 | 0.96 | 1.07 | 1.07 | 1.07 | 1.07 |
| % Water Absorption (By Weight) | 60.36 | 37.38 | 62.48 | 20.71 | 15.82 | 3.63 |

Table 2 relates to experimental gypsum panels made with 1600 lbs/msf stucco, a water:stucco ratio of 0.96, siliconate, and sodium trimetaphosphate (STMP), in varying amounts. Table 3 relates to experimental gypsum panels made with 1600 lbs/msf stucco, a water:stucco ratio of 0.96, siliconate and siloxane, in varying ratios, and sodium trimetaphosphate (STMP), in varying amounts. The tables and FIGS. 5 and 6 illustrate the results of the 2-hour absorption tests.

Figure 5:
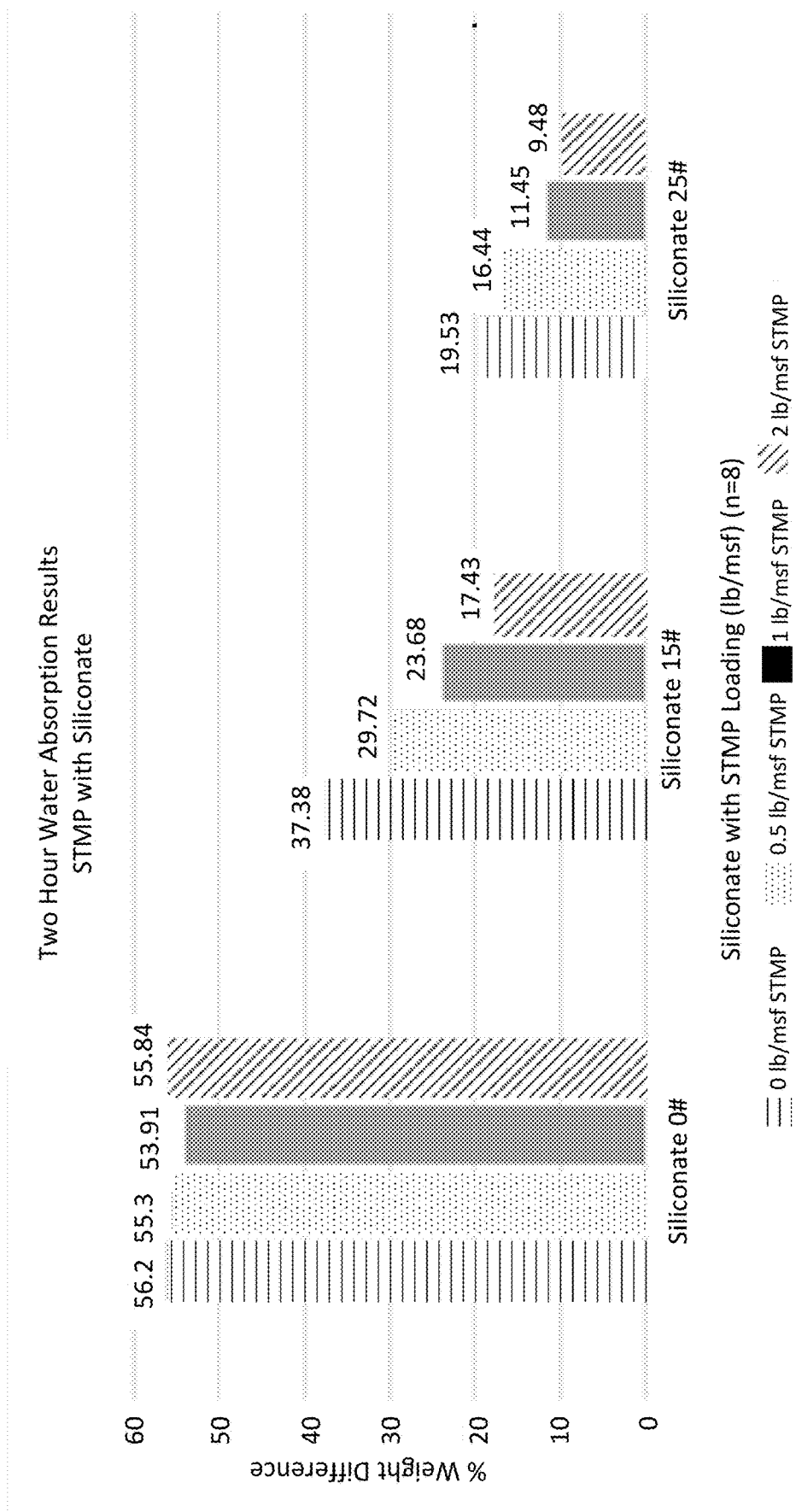
FIG. 5 is a graph showing the total water absorption weight difference (%) for various samples as tested in the Examples.

As can be seen at Table 2 and FIG. 5, a panel containing STMP and siliconate in amounts of 2 lbs/msf and 25 lbs/msf, respectively, had a water absorption of 9.48%. By comparison, sample panels having the same amount of siliconate, without STMP, had a water absorption of 19.53%, while sample panels having the same amount of STMP, without siliconate, had a water absorption of 55.84%. Such a significant synergistic effect between these amounts of STMP and siliconate was not predictable. In fact, each sample containing STMP and siliconate displayed at least about a 10% lower weight percent gain then identical panels without the STMP.

Figure 6:
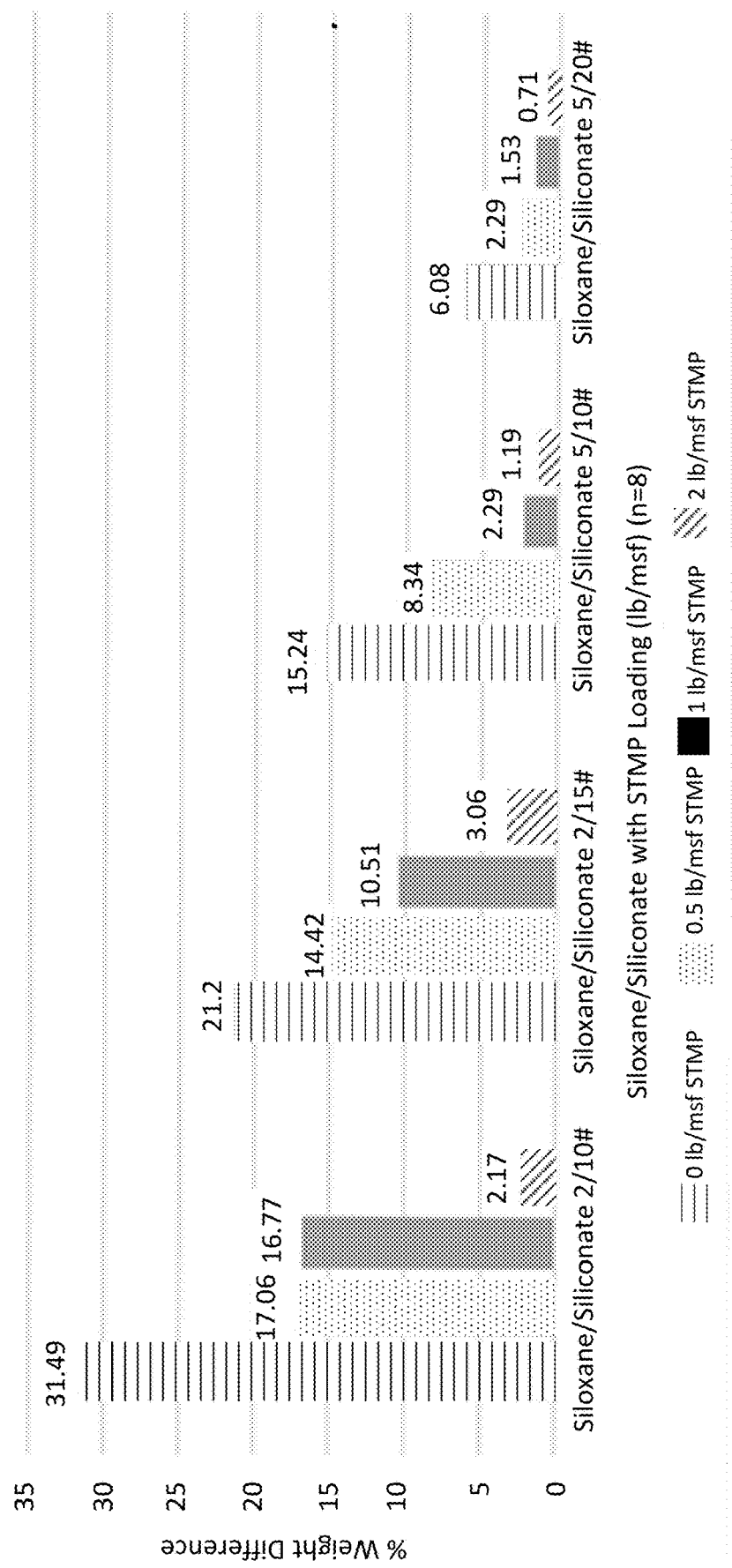
FIG. 6 is a graph showing the total water absorption weight difference (%) for various samples as tested in the Examples.

As can be seen at Table 3 and FIG. 6, a panel containing STMP and siloxane/siliconate in amounts of 2 lbs/msf and 2/10 lbs/msf, respectively, had a water absorption of 1.19%. By comparison, sample panels having the same amount of siloxane/siliconate, without STMP, had a water absorption of 15.24%. Such a significant synergistic effect between these amounts of STMP and siloxane/siliconate was not predictable. Moreover, the use of relatively low siloxane/high siliconate ratios is opposite the traditional relative blended amounts of these components. In particular, blends of high siloxane/low siliconate ratios of up to 10/1, by weight, are more traditionally utilized to achieve water-resistant requirements. In contrast, the embodiments of the present disclosure containing siloxane and siliconate may contain these components in a reverse ratio, i.e., siloxane/siliconate from about 1.0/1.0 to 1.0/30.0, such as from about 1.0/1.0 to 1.0/10.0.

Thus, it was surprisingly found that gypsum boards containing a 2/10 lbs/msf blend of siloxane/siliconate with 2.0 lbs/msf STMP, displayed improved water resistance that was approximately 15 times more than solely 2/10 lbs/msf siloxane/siliconate blend (2.17% vs. 31.49%). The STMP addition rate may be from 0.5 to 20.0 lb/msf, such as ranging from about 0.5 to 10.0 lb/msf. The siliconate addition rate range may be from about 5.0 to 50.0 lb/msf, such as from about 10.0 to 30 lb/msf, and the siloxane addition rate range can be from about 1.0 to 20.0 lb/msf, such as from about 2.0 to 10.0 lb/msf.

TABLE 2

Sample Board Parameters and Test Results

| Siliconate lbs/msf | 0.00 | 15.00 | 25.00 |
|---|---|---|---|
| 0.00 lbs/msf STMP | 56.20 | 37.38 | 19.53 |
| 0.50 lbs/msf STMP | 55.30 | 29.72 | 16.44 |
| 1.00 lbs/msf STMP | 53.91 | 23.68 | 11.45 |
| 2.00 lbs/msf STMP | 55.84 | 17.43 | 9.48 |

TABLE 3

Sample Board Parameters and Test Results

| Siloxane/Siliconate, lbs/msf | 2/10# | 2/15# | 5/10# | 5/20# |
|---|---|---|---|---|
| 0.00 lbs/msf STMP | 31.49 | 21.2 | 15.24 | 6.08 |
| 0.50 lbs/msf STMP | 17.06 | 14.42 | 8.34 | 2.29 |
| 1.00 lbs/msf STMP | 16.77 | 10.51 | 2.29 | 1.53 |
| 2.00 lbs/msf STMP | 2.17 | 3.06 | 1.19 | 0.71 |

Figure 7:
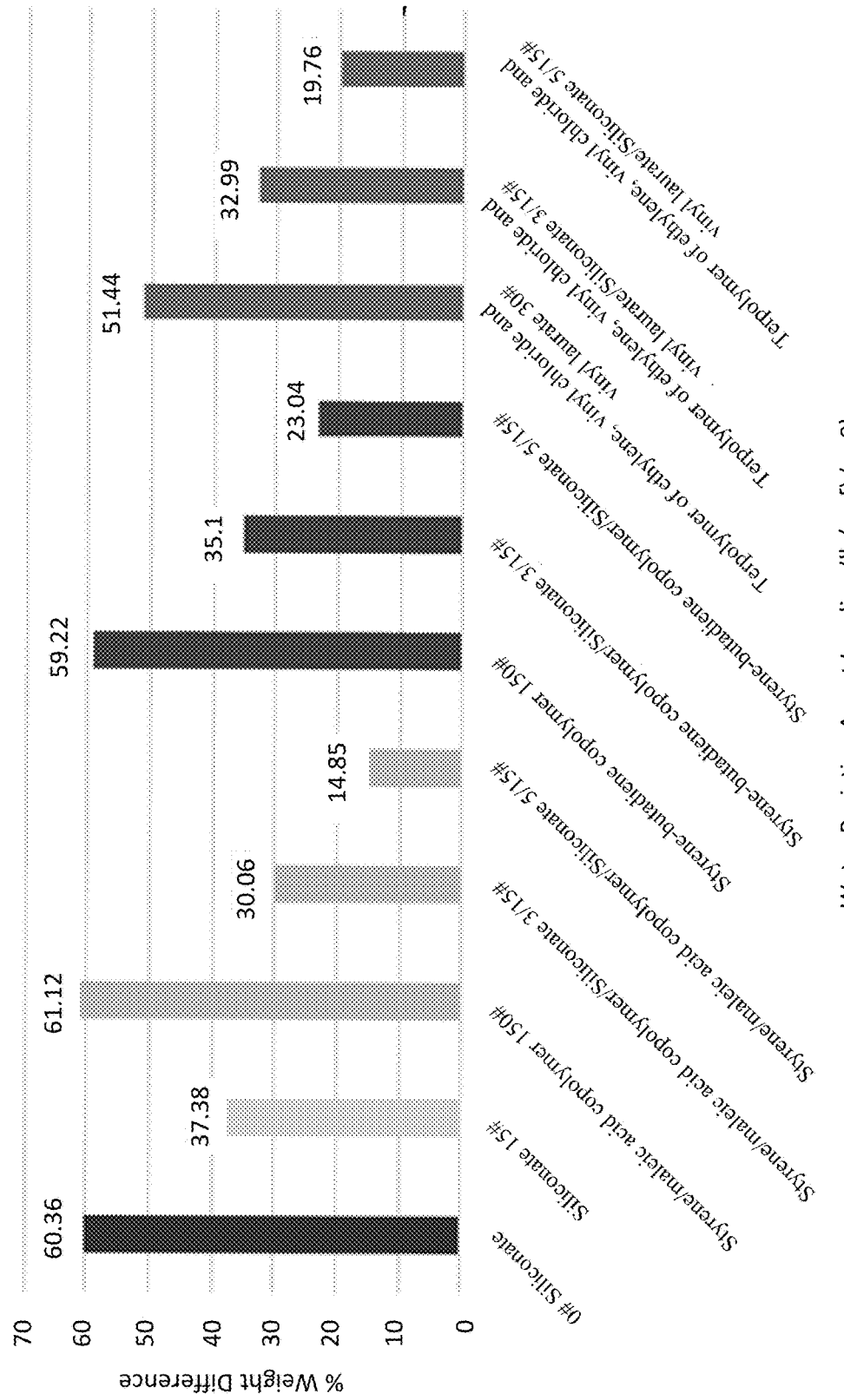
FIG. 7 is a graph showing the total water absorption weight difference (%) for various samples as tested in the Examples.

Table 4 relates to experimental gypsum panels made with 1600 lbs/msf gypsum stucco, siliconate, and various hydrophobic latex copolymers and terpolymers, in varying amounts. The results of the water absorption tests are also given, and are illustrated in FIG. 7. Generally, hydrophobic latexes and dispersible polymer powders, e.g. styrene/maleic acid copolymer (such as NovaCote1936HS, commercially available from G-P Resins), styrene-butadiene copolymer (such as Genceal 8100, commercially available from Omnova), terpolymer of ethylene, vinyl chloride and vinyl laurate (such as Vinnaps 8034, commercially available from Wacker), do not provide good water-resistant benefits to gypsum boards. However, these experiments surprisingly showed that gypsum boards containing 5 lbs/msf latex with 15 lbs/msf siliconate displayed an improved water resistance nearly twice as much as boards solely with 15 lbs/msf siliconate. The addition rate for latex may range from about 1 to 20.0 lb/msf, such as from about 3 to 10.0 lbs/msf. The siliconate addition rate range may be from about 5.0 to 50.0 lbs/msf, such as from about 10.0 to 30 lbs/msf.

TABLE 4

Sample Board Parameters and Test Results

| Component | Control | Siliconate | Styrene/maleic acid copolymer | | | Styrene-butadiene copolymer | | | Terpolymer of ethylene, vinyl chloride and vinyl laurate | | |
|---|---|---|---|---|---|---|---|---|---|---|---|
| Hydrophobic Latex (lbs/msf) | 0 | 0 | 150 | 3 | 5 | 150 | 3 | 5 | 30 | 3 | 5 |
| Siliconate (lbs/msf) | 0 | 15 | 0 | 15 | 15 | 0 | 15 | 15 | 0 | 15 | 15 |
| Latex:Siliconate | 0 | 0.53 | 0.4 | 0.24 | 0.13 | 0 | 0 | 0 | 0 | 1.88 | 1.88 |
| Stucco (lbs/msf) | 1600 | 1600 | 1600 | 1600 | 1600 | 1600 | 1600 | 1600 | 1600 | 1600 | 1600 |
| Water:Stucco | 0.96 | 0.96 | 0.96 | 0.96 | 0.96 | 0.96 | 0.96 | 0.96 | 0.96 | 0.96 | 0.96 |
| 2-hr Water absorption (%) | 06.40 | 37.40 | 61.10 | 30.10 | 14.90 | 59.20 | 35.10 | 23.00 | 51.40 | 33.00 | 19.80 |

Figure 8:
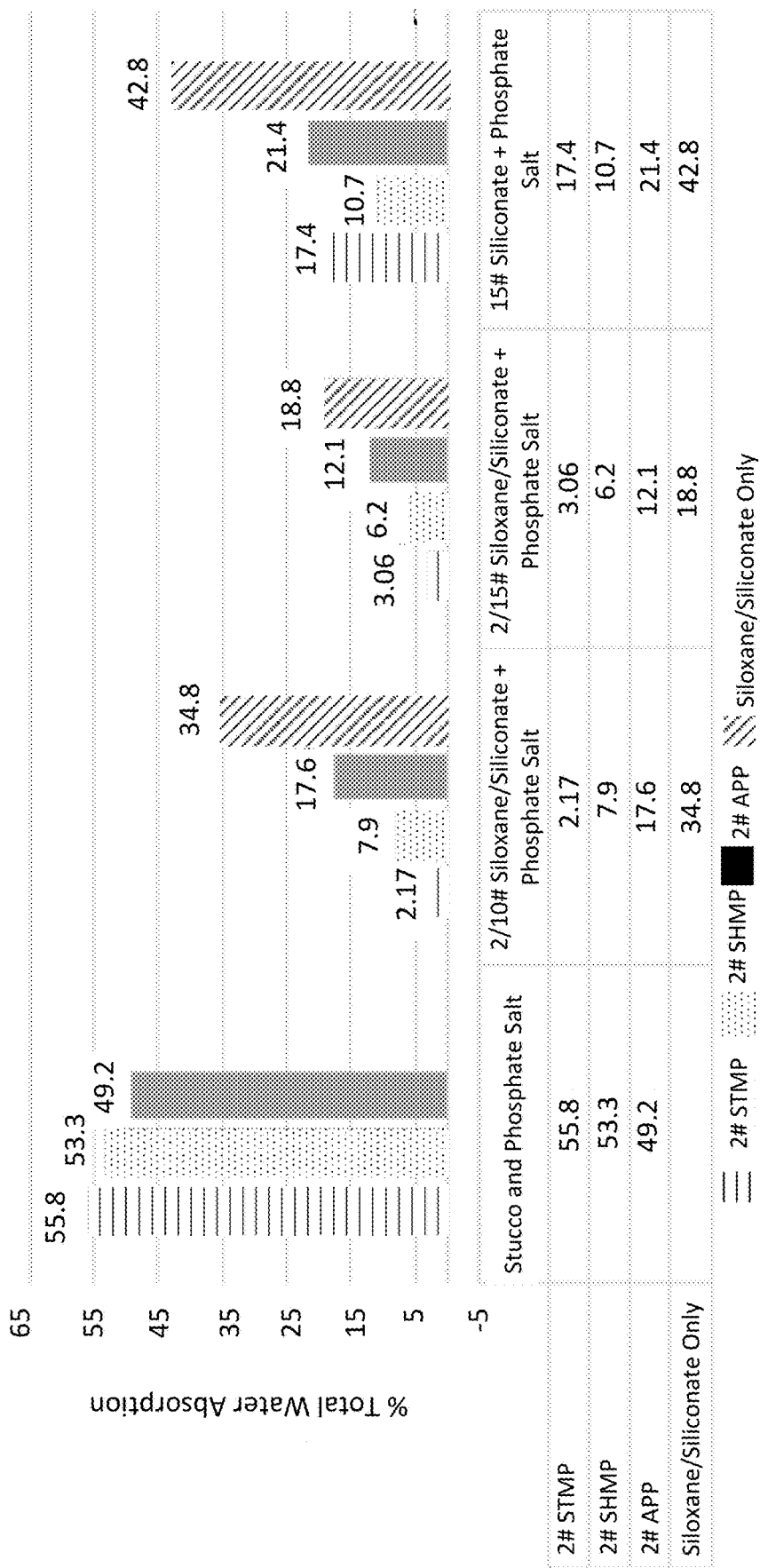
FIG. 8 is a graph showing the total water absorption weight difference (%) for various samples as tested in the Examples.

Table 5 relates to experimental gypsum panels made using stucco, varying amounts and combinations of siloxane and siliconate, and various amounts of three phosphate salts (sodium trimetaphosphate (STMP), sodium hexametaphosphate (SHMP), and ammonium polyphosphate (APP)). The results of water absorption tests are also given, and are illustrated in FIG. 8. As can be seen, addition of 2 lbs/msf of each of the tested phosphate salts resulted in significant improvements in water resistance of the resulting gypsum panels, as compared to otherwise identical panels not containing the phosphate salt.

TABLE 5

Sample Board Parameters and Test Results

| | Stucco + Phosphate Salt | 2/10# Siloxane/Siliconate + Phosphate Salt | 2/15# Siloxane/Siliconate + Phosphate Salt | 15# Siliconate + Phosphate Salt |
|---|---|---|---|---|
| 2# STMP | 55.8% | 2.17% | 3.06% | 17.4% |
| 2# SHMP | 53.3% | 7.9% | 6.2% | 10.7% |
| 2# APP | 49.2% | 17.6% | 12.1% | 21.4% |
| Siloxane/Siliconate Only | | 34.8% | 18.8% | 42.8% |

In sum, these experiments demonstrated that the addition of phosphate salts and polymers in the gypsum core slurry, at sufficient levels, can significantly enhance the water resistance performance of siliconate, and/or low siloxane/ high siliconate blends. A synergistic water-resistant improvement effect was observed when either a phosphate salt and/or polymer was mixed with either siliconate, or a low siloxane/high siliconate blend, in comparison to their sole counterparts, siliconate and low siloxane/high siliconate blends. Thus it was surprisingly found that phosphate salts and polymers, such as sodium trimetaphosphate (STMP), sodium hexametaphosphate (SHMP), ammonium polyphosphate (APP), polyvinyl alcohol (PVA), a hydrophobic latex, or a dispersible polymer powder comprising a styrene/maleic acid copolymer, a styrene-butadiene copolymer, a styrene-acrylate, an acrylate, or a terpolymer of ethylene, vinyl chloride and vinyl laurate can significantly enhance water resistance performance of siliconate, and/or low siloxane/high siliconate blends, in comparison to neat siliconate and neat low siloxane/high siliconate blends.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A method of making a gypsum panel, comprising:
    forming a first gypsum slurry by combining stucco, water, a siliconate, siloxane, and a phosphate salt; and
    setting the first gypsum slurry to form at least part of a core of the gypsum panel, wherein:
    the gypsum panel displays a 2-hour water absorption test weight increase of at least 10 weight percent less than an otherwise identical comparative panel containing no phosphate salt in its core,
    the siliconate is present in the first gypsum slurry in an amount of 25 lb/msf to about 50 lb/msf and the gypsum panel has a thickness of ¼ inch to about ¾ inch, and
    a ratio of the siloxane to the siliconate in the first gypsum slurry is from 1:10 to 1:30.

2. The method of claim 1, wherein the phosphate salt comprises sodium trimetaphosphate (STMP), sodium hexametaphosphate (SHMP), or ammonium polyphosphate (APP).

3. The method of claim 1, wherein:
    the siliconate is present in the first gypsum slurry in an amount of 25 lb/msf to 40 lb/msf, and
    a thickness of the for gypsum panel is ¼ inch to ⅝ inch.

4. The method of claim 1, wherein:
    the siliconate is present in the first gypsum slurry in an amount of from 25 lb/msf to 30 lb/msf, and
    a thickness of the gypsum panel is ¼ inch to ⅝ inch.

5. The method of claim 1, wherein a ratio of siloxane to siliconate in the first gypsum slurry is from 1:15 to 1:20.

6. The method of claim 1, wherein a ratio of siloxane to siliconate in the first gypsum slurry is 1:15.

7. The method of claim 1, wherein:
    the siloxane is present in the first gypsum slurry in an amount of from 1 lb/msf to 5 lb/msf, and
    a thickness of the gypsum panel is ¼ inch to ⅝ inch.

8. The method of claim 1, wherein:
    the siloxane is present in the first gypsum slurry in an amount of from 2 lb/msf to 5 lb/msf, and
    a thickness of the gypsum panel is ¼ inch to ⅝ inch.

9. The method of claim 1, wherein the siliconate comprises sodium or potassium methylsiliconate, sodium or potassium ethyl siliconate, propylsiliconate, isopropylsiliconate, butylsiliconate, octylsiliconate, phenylsiliconate, or any combination thereof.

10. The method of claim 1, wherein the siloxane comprises polymethylhydrogensiloxane.

11. The method of claim 1, wherein:
    the phosphate salt is present in the first gypsum slurry in an amount of 0.5 lb/msf to 50 lb/msf, and
    a thickness of the gypsum panel is ¼ inch to ⅝ inch.

12. The method of claim 1, wherein:
    the phosphate salt is present in the first gypsum slurry in an amount of 10 lb/msf to 30 lb/msf, and
    a thickness of the gypsum panel is ¼ inch to ⅝ inch.

13. The method of claim 1, wherein:
    the phosphate salt comprises STMP, SHMP, or APP, that is present in the first gypsum slurry in an amount of 0.5 lb/msf to 10 lb/msf, and
    a thickness of the gypsum panel is ¼ inch to ⅝ inch.

14. The method of claim 1, wherein the gypsum panel displays:
    an average water absorption of not more than 15 percent by weight, after 2 hours of immersion, according to ASTM C1396/C1396M-14a (2014),
    an average water absorption of not more than 15 percent by weight, after 2 hours of immersion, according to ASTM C1177/C117M-13 (2013), and/or
    an average water absorption of not more than 5 percent by weight, after 2 hours of immersion, according to ASTM C1178/C1188M-13 (2013).

15. The method of claim 1, further comprising depositing the first gypsum slurry onto a first surface of a facer material.

16. The method of claim 15, wherein the facer material comprises a fiberglass mat or a paper facer.

17. A gypsum panel made by the method of claim 1.

* * * * *